United States Patent
Birke et al.

(10) Patent No.: US 10,102,033 B2
(45) Date of Patent: Oct. 16, 2018

(54) METHOD AND SYSTEM FOR PERFORMANCE TICKET REDUCTION

(71) Applicant: International Business Machines Corporation, Armonk, NY (US)

(72) Inventors: Robert Birke, Kilchberg (CH); Yiyu L. Chen, Thalwil (CH); Thomas Scherer, Mettmenstetten (CH); Martin L. Schmatz, Rueschlikon (CH); Ji Xue, Williamsburg, VA (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/165,572

(22) Filed: May 26, 2016

(65) Prior Publication Data
US 2017/0344400 A1    Nov. 30, 2017

(51) Int. Cl.
*G06F 9/455* (2018.01)
*G06F 9/46* (2006.01)
(Continued)

(52) U.S. Cl.
CPC ........... *G06F 9/50* (2013.01); *G06F 9/455* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01);
(Continued)

(58) Field of Classification Search
None
See application file for complete search history.

(56) References Cited

U.S. PATENT DOCUMENTS 7,032,016 B2    4/2006   Cerami et al.
8,499,066 B1 *  7/2013   Zhang ............... H04L 47/823
                                                        709/200
(Continued)

OTHER PUBLICATIONS

Beloglazov et al., "Adaptive Threshold-Based Approach for Energy-Efficient Consolidation of Virtual Machines in Cloud Data Centers", MGC'03, Nov. 29-Dec. 3, 2010, Banglaore, India.
(Continued)

*Primary Examiner* — Charles M Swift
(74) *Attorney, Agent, or Firm* — Scully, Scott, Murphy & Presser, P.C.; Daniel P. Morris, Esq.

(57) ABSTRACT

A computer-implemented method for preventing the occurrence of performance tickets in a computing system comprising a plurality of virtual machines hosted by a host computing system. The method comprising the steps of: monitoring a resource usage parameter associated with the workload of a virtual machine in order to obtain historic resource usage information; determining information regarding certain dependencies within the historic resource usage information; selecting partial information from the historic resource usage information based on said determined information regarding certain dependencies; estimating the future workload of the virtual machines based on said selected partial information; and resizing the computational resources of one or more virtual machines based on the estimated future workload such that a usage threshold of a computational resource is below a given threshold in order to avoid the generation of a performance ticket.

18 Claims, 8 Drawing Sheets

(51) Int. Cl.
G06F 15/173 (2006.01)
G06F 9/50 (2006.01)
G06N 3/08 (2006.01)
G06F 9/48 (2006.01)

(52) U.S. Cl.
CPC .......... *G06F 9/4881* (2013.01); *G06F 9/5005* (2013.01); *G06F 9/505* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5077* (2013.01); *G06F 9/5083* (2013.01); *G06F 9/5088* (2013.01); *G06N 3/08* (2013.01); *G06F 2009/4557* (2013.01); *G06F 2009/45575* (2013.01); *G06F 2009/45591* (2013.01); *G06F 2009/45595* (2013.01)

(56) References Cited

U.S. PATENT DOCUMENTS

| | | | | |
|---|---|---|---|---|
| 2003/0139905 | A1* | 7/2003 | Helsper | G06F 11/3006 702/182 |
| 2005/0097207 | A1* | 5/2005 | Gluhovsky | H04L 41/0681 709/224 |
| 2009/0158275 | A1 | 6/2009 | Wang et al. | |
| 2010/0199285 | A1* | 8/2010 | Medovich | G06F 9/45533 718/104 |
| 2011/0029970 | A1* | 2/2011 | Arasaratnam | G06F 9/45558 718/1 |
| 2011/0126207 | A1* | 5/2011 | Wipfel | H04L 9/3213 718/104 |
| 2011/0202657 | A1* | 8/2011 | Chang | G06F 9/505 709/226 |
| 2012/0246638 | A1* | 9/2012 | He | G06F 9/45558 718/1 |
| 2013/0166724 | A1* | 6/2013 | Bairavasundaram | G06F 9/5016 709/224 |
| 2014/0040474 | A1* | 2/2014 | Blagodurov | G06F 9/5088 709/226 |
| 2014/0082612 | A1 | 3/2014 | Breitgand et al. | |
| 2014/0108640 | A1* | 4/2014 | Mathis | H04L 41/145 709/224 |
| 2014/0222889 | A1* | 8/2014 | Bello | H04L 29/06537 709/202 |
| 2014/0282541 | A1* | 9/2014 | Perlegos | G06F 9/45558 718/1 |
| 2014/0331222 | A1 | 11/2014 | Zheng | |
| 2015/0095119 | A1* | 4/2015 | Hariharan | G06Q 10/06393 705/7.39 |
| 2015/0309825 | A1* | 10/2015 | Farkas | G06F 9/45558 718/1 |
| 2015/0309826 | A1* | 10/2015 | Kirubanandam | G06F 9/45558 718/1 |
| 2015/0372878 | A1* | 12/2015 | Ganesan | H04L 43/16 709/223 |
| 2016/0070602 | A1* | 3/2016 | Shimogawa | G06F 9/45558 718/1 |
| 2016/0124765 | A1* | 5/2016 | Kaneko | G06F 9/45558 718/1 |
| 2016/0179560 | A1* | 6/2016 | Ganguli | G06F 9/45558 718/1 |
| 2016/0320818 | A1* | 11/2016 | Huang | G06F 1/26 |
| 2016/0378519 | A1* | 12/2016 | Gaurav | G06F 9/5077 718/1 |
| 2017/0272319 | A1* | 9/2017 | Sheen | H04W 24/10 |
| 2017/0286146 | A1* | 10/2017 | Voigt | G06F 9/45558 |

OTHER PUBLICATIONS

Cherkasova et al., "When Virtual is Harder than Real: Resource Allocation Challenges in Virtual Machine Based IT Environments", Enterprise Systems and Software Laboratory, HP Laboratories, Palo Alto, HPL-2007-25, Feb. 8, 2007, University of California, San Diego, Hewlett-Packard Development Company, L.P., 2007, pp. 1-9.

* cited by examiner

METHOD AND SYSTEM FOR PERFORMANCE TICKET REDUCTION

BACKGROUND

The present invention relates to a method for reducing the occurrence of performance tickets. More specifically, the invention relates to a method for predicting the workload of virtual machines hosted on a host computing system and distributing the available system resources such that the number of occurring performance tickets is reduced.

SUMMARY

In one aspect, a computer-implemented method for preventing the occurrence of performance tickets in a computing system comprising a plurality of virtual machines hosted by a host computing system is provided. The method comprises:
monitoring a resource usage parameter associated with the workload of a virtual machine in order to obtain historic resource usage information;
determining information regarding certain dependencies within the historic resource usage information;
selecting partial information from the historic resource usage information based on said determined information regarding certain dependencies;
estimating the future workload of the virtual machines based on said selected partial information; and
resizing the computational resources of one or more virtual machines based on the estimated future workload such that a usage threshold of a computational resource is below a given threshold in order to avoid the generation of a performance ticket.

According to a further aspect, a computer program product for preventing the occurrence of performance tickets in a computing system comprising a plurality of virtual machines hosted by a host computing system is provided. The computer program product comprises a computer readable storage medium having program instructions embodied therewith, the program instructions executable by a processor to cause the processor to execute a method comprising:
monitoring a resource usage parameter associated with the workload of a virtual machine in order to obtain historic resource usage information;
determining information regarding certain dependencies within the historic resource usage information;
selecting partial information from the historic resource usage information based on said determined information regarding certain dependencies;
estimating the future workload of the virtual machines based on said selected partial information; and
resizing the computational resources of one or more virtual machines based on the estimated future workload such that a usage threshold of a computational resource is below a given threshold in order to avoid the generation of a performance ticket.

According to yet a further aspect, a system for preventing the occurrence of performance tickets in a computing system comprising a plurality of virtual machines hosted by a host computing system is provided. The system is adapted to:
monitor a resource usage parameter associated with the workload of a virtual machine in order to obtain historic resource usage information;
determine information regarding certain dependencies within the historic resource usage information;
select partial information from the historic resource usage information based on said determined information regarding certain dependencies;
estimate the future workload of the virtual machines based on said selected partial information; and
resize the computational resources of one or more virtual machines based on the estimated future workload such that a usage threshold of a computational resource is below a given threshold in order to avoid the generation of a performance ticket.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

The present invention may also include the following example features:

According to an example embodiment, the step of determining information regarding certain dependencies within the historic resource usage information comprises determining information regarding temporal dependencies within historic resource usage information of a certain virtual machine and/or determining information regarding spatial dependencies between historic resource usage information of different virtual machines. In other words, temporal dependencies may be regularly or periodically appearing characteristics within the historic resource usage information and spatial dependencies may be dependencies which appear in historic resource usage information of different virtual machines (VM), e.g. caused by influences of the workload of a first VM to the workload to a second VM. By using spatial and temporal dependencies, the quality of workload estimation result can be significantly increased.

According to an example embodiment, said information regarding temporal dependencies is determined based on an auto-correlation function. Said auto-correlation function may provide one or more features which show a certain periodicity and can therefore be used for estimating the future usage series.

According to an example embodiment, said information regarding spatial dependencies is determined based on a Dynamic-Time-Warping algorithm. Said Dynamic-Time-Warping algorithm may provide means for measuring the similarity between different historic resource usage information (in the following also referred to as historic usage series) in order to be able to detect correlations between usage series of different VMs and group said usage series according to their similarity.

According to an example embodiment, selecting partial information from historic resource usage information comprises selecting partial information which shows significant temporal periodicity. For example, the auto-correlation function may provide multiple characteristics indicating temporal periodicities and one or more characteristics which are the most informative ones are selected in order to predict the future resource usage (usage series). Thereby, the prediction quality is significantly improved and the computational effort is reduced.

According to an example embodiment, selecting partial information from historic resource usage information comprises selecting partial information associated with a first virtual machine which shows significant dependency on or similarity to resource usage information of a second virtual machine. In other words, both spatial and temporal dependencies can be used to select the most informative features for future usage series prediction. For example, based on recognized spatial dependencies, certain historic resource usage information is selected which is representative for the usage of computational resources of one or more further VMs. An auto-correlation function may be applied to the selected historic resource usage information in order to determine temporal dependencies, most informative temporal dependencies are selected and future usage series is predicted based on the selected temporal dependencies. Due to using spatial dependencies as well as temporal dependencies, the computational effort can be significantly reduced.

According to example embodiments, said estimating of future workload is performed based on neural networks and said neural networks are trained based on said partial information selected from the historic resource usage information. Preferably, a set of neural networks using different algorithms may be used in parallel during said training (ensemble method). For each group of VMs which do not show spatial dependencies, one or more neural networks may be trained in order to predict the future usage of computational resources.

According to example embodiments, said future workload is predicted by said trained neural networks. As mentioned before, preferably, a set of neural networks using different algorithms may be used in parallel during said predicting (ensemble method) in order to enhance the quality of the estimation result.

According to example embodiments, said future workload is predicted by estimating the future workload of a first virtual machine based on investigated temporal dependencies and estimating the future workload of a second virtual machine by considering that the first and the second virtual machine show similar temporal dependencies. Due to using spatial dependencies between different VMs, the computational effort can be significantly reduced.

According to example embodiments, an error check is performed on the estimated future workload, said error check detecting a poor workload estimation result if the estimated workload leaves a workload range defined by a threshold value. Thereby it is possible to repeat workload prediction if the predicted result indicates that the prediction result is imprecise.

According to example embodiments, said steps of
determining information regarding certain dependencies within the historic resource usage information;
selecting partial information from the historic resource usage information based on said determined information regarding certain dependencies; and
estimating the future workload of the virtual machines based on said selected partial information
are repeated if the error check indicates a poor workload estimation result.

According to an example embodiment, for each virtual machine a demand table and a ticket table associated with the demand table is provided, wherein said demand table comprises entries specifying the usage of certain computational resources and said ticket table comprises entries specifying the occurrence of tickets associated with a respective usage of certain computational resources.

According to example embodiments, the demand table is sorted according to the used computational resources. For example, the demand table may be sorted in a descending order, i.e. staring with the demand with the highest computational effort.

According to example embodiments, for at least some entries of the demand table, a ticket-increase-ratio is calculated which is indicative for the ratio of ticket reduction and for freeing of resources which can be obtained by choosing reduced computational resources according to subsequent entries of the demand table.

According to example embodiments, the ticket-increase-ratio is defined by:

$$TIR_{i,o} = \frac{P_{i,o-1} - P_{i,o}}{D_{i,o} - D_{i,o-1}}$$

wherein $D_{i,o}$ denotes an entry of the demand table, $P_{i,o}$ denotes an entry of the ticket table, i denotes the index of the respective virtual machine and o denotes the index of an entry within the demand table, respectively, the ticket table. In other words, the ticket-increase-ratio is defined by the ratio of the ticket increase to the freeing up of computational resources.

According to example embodiments, the computational resources provided to the respective virtual machines are adapted based on the ticket-increase-ratio such that starting at computational resource allocation referring to the highest computational resource demand of a respective virtual machine said computational resource allocation is lowered by considering the ticket-increase-ratio until a capacity constraint defined by the available computational resources of the physical sever hosting the virtual machines is met. In other words, the computational resources assigned to one or more virtual machines are reduced iteratively by considering the ticket-increase-ratio in order to share the available computational resources between the virtual machines in an optimal way (in the sense of reduced performance ticket occurrence).

According to example embodiments, the computational resources provided to the respective virtual machines are reduced based on the ticket-increase-ratio gradually by choosing a computational resource allocation for the respective virtual machine which provides freeing-up of physical resources with no or minimum increase of the number of tickets occurring due to said freeing-up of computational resources until a capacity constraint defined by the available computational resources of the host computing system is met. In other words, among all virtual machines hosted by said host computing system, the computational resources of the virtual machine is cut down which comprises the lowest ticket-increase-ratio, i.e. which promises the lowest increase of issued performance tickets when decreasing the assigned computational resources.

According to example embodiments, said resizing of computational resources comprises providing information regarding a desired resource allocation of the virtual machines to an allocator entity included in the host computing system and wherein said allocator entity initiates a resource allocation for the respective virtual machines according to said resource allocation information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
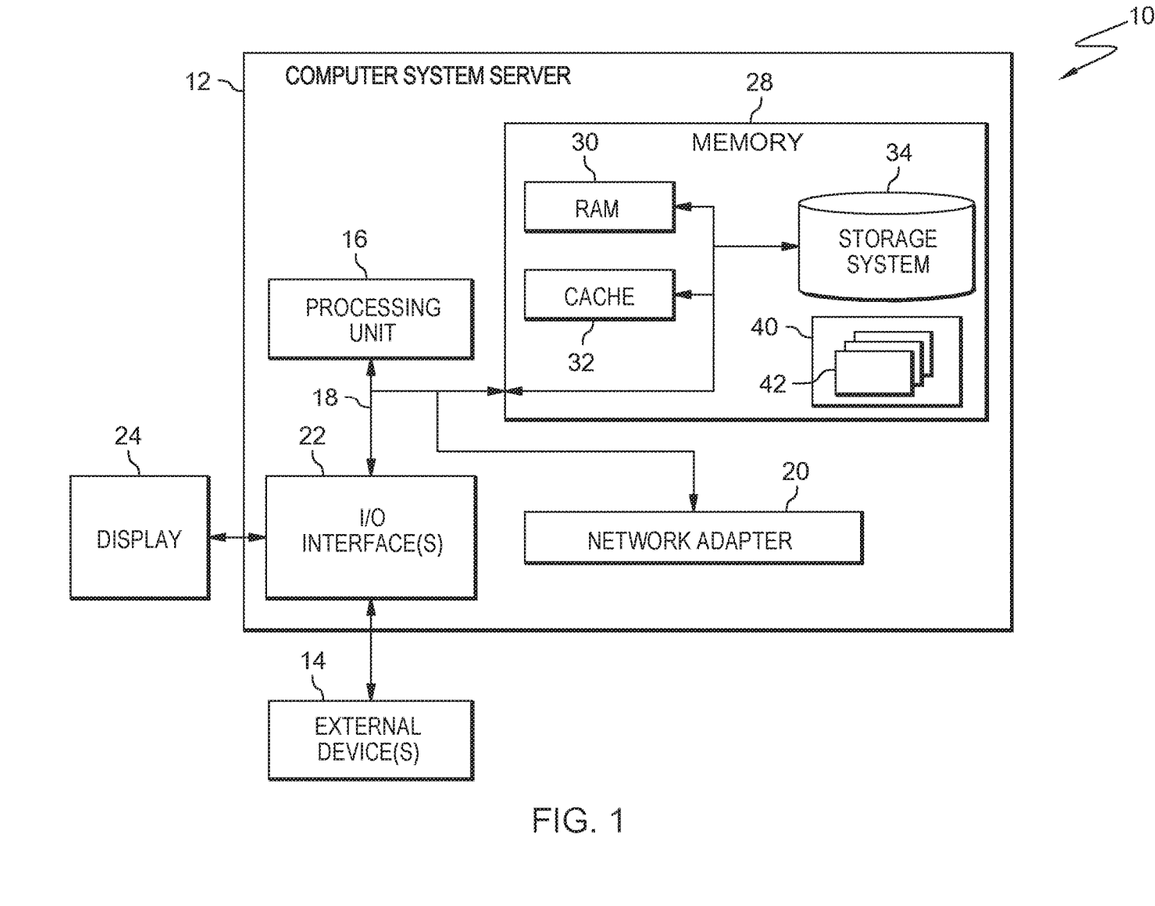
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
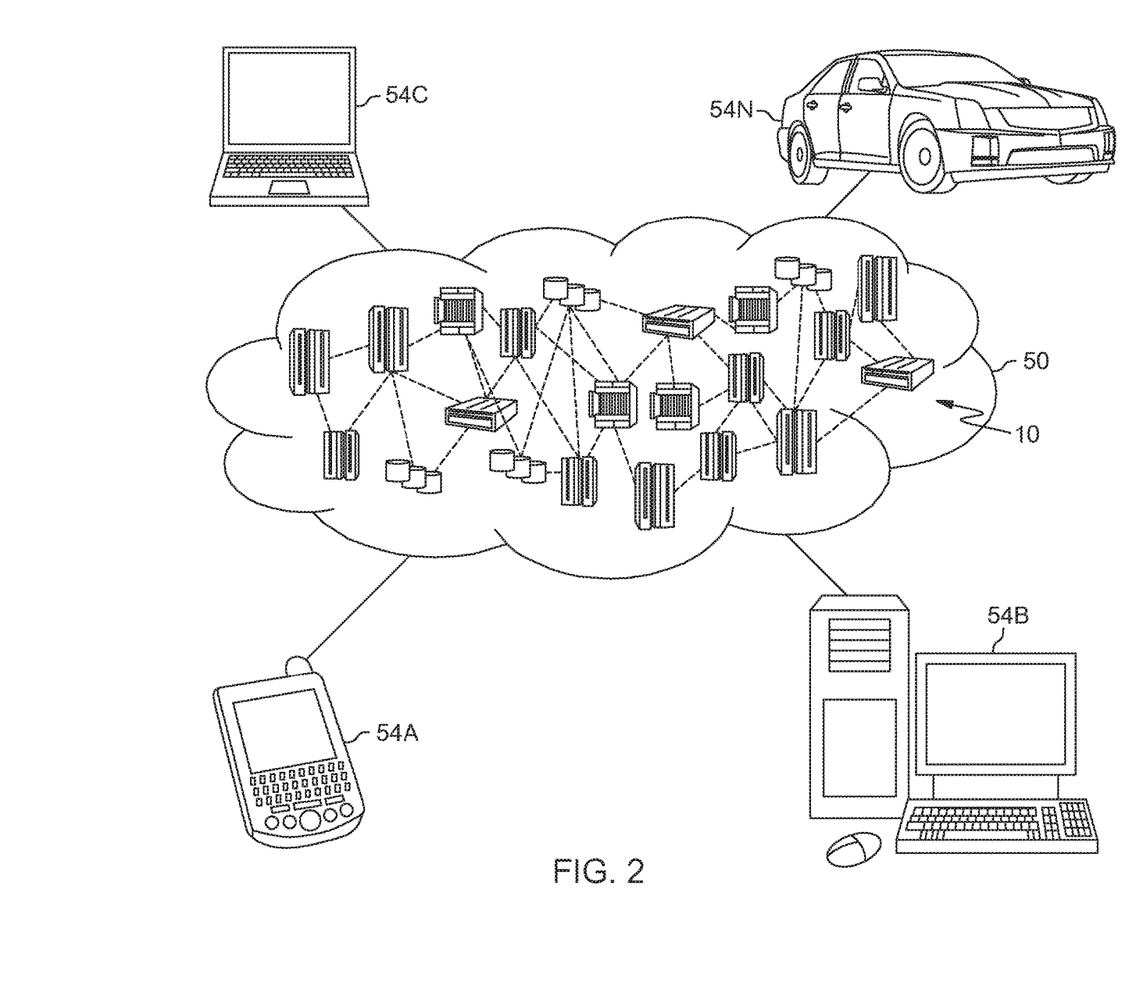
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
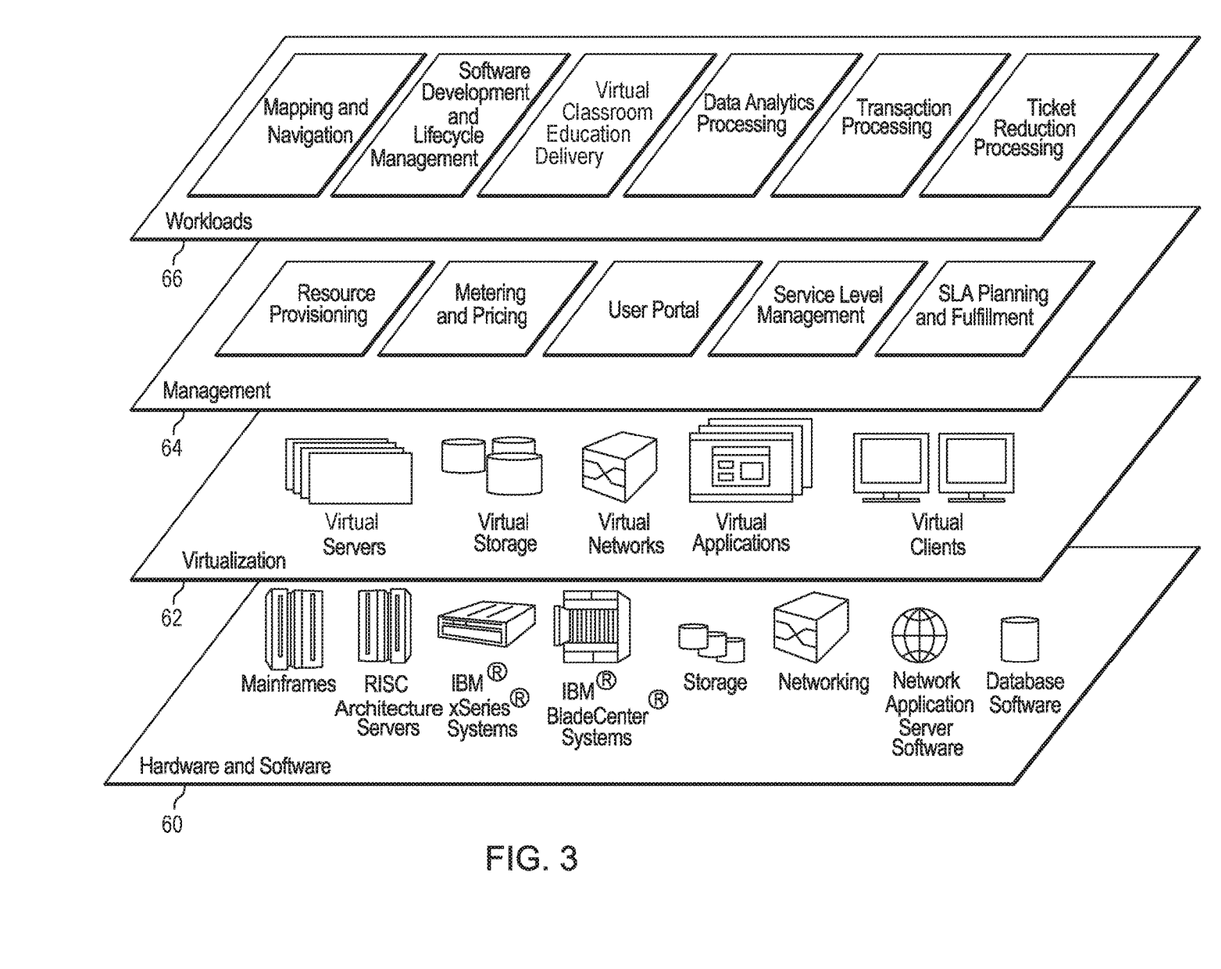
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and ticket reduction processing.

Figure 4:
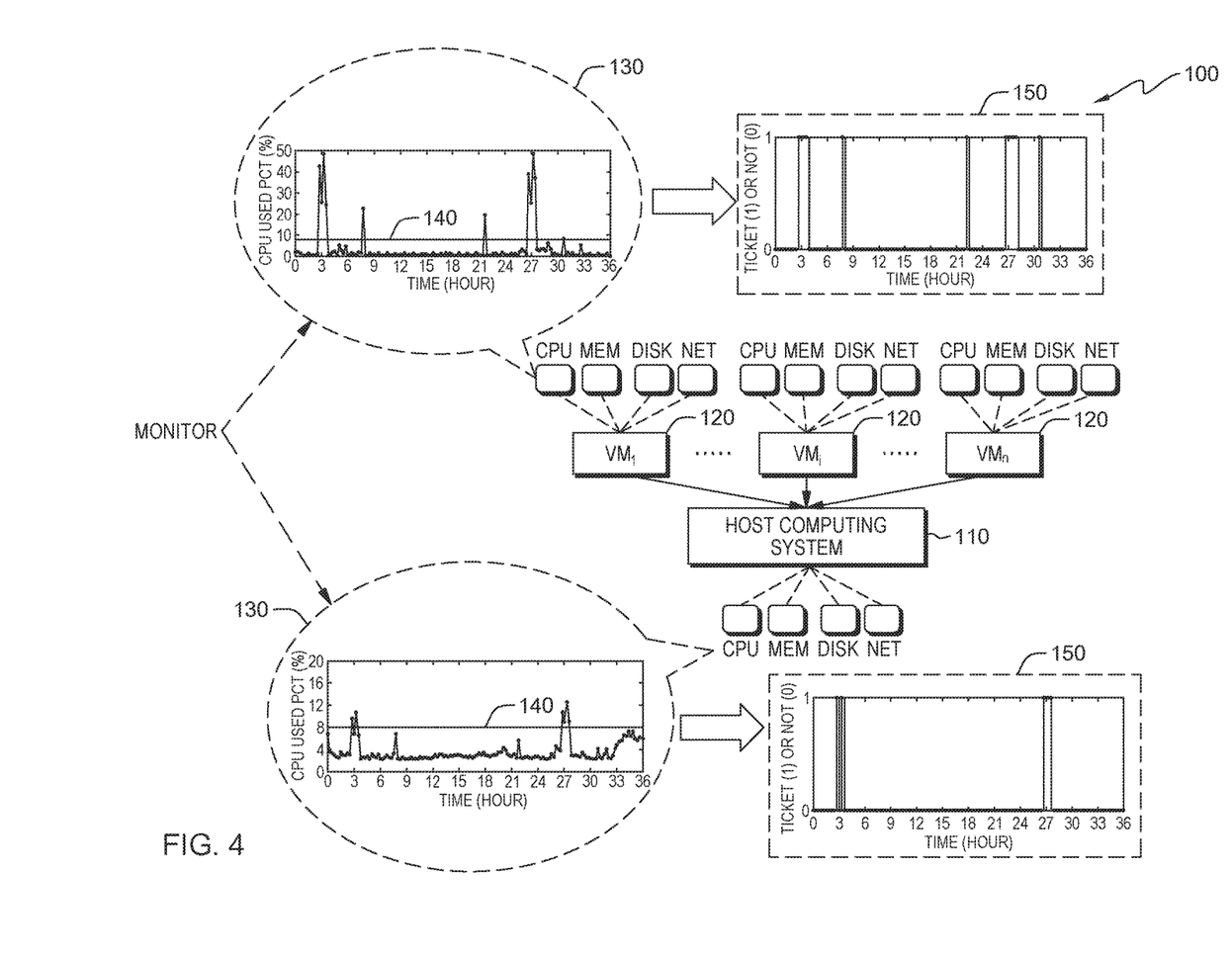
FIG. 4 schematically illustrates the monitoring of computational resources of multiple virtual machines hosted on a host computing system according to an example embodiment.

FIG. 4 illustrates a computing system 100 comprising a host computing system 110 and a plurality of virtual machines (VMs) VM1-VMn 120 which are hosted by said host computing system 110. Said host computing system 110 is adapted to allocate computational resources to the respective VMs 120, for example, CPU power, an amount of memory, disc space and/or network connection resources. The host computing system 110 may be a single server or may be provided by multiple distributed servers in a cloud environment. Each VM 120 is associated with one or more monitoring entities which are adapted to monitor certain computational resources of the respective VM 120. Said monitoring entity may be provided by a workload collector of the respective VM 120. In addition, also the host computing system 110 may comprise a monitoring entity (e.g. provided by a workload collector) for monitoring the usage of computational resources. Based on the monitoring entities, samples or continuous information regarding the actually used computational resources are obtained. The computational resources associated with the VMs 120 may be assigned by the host computing system 110 to the respective VMs 120, i.e. the host computing system 110 decides how many computational resources (e.g. CPU power, amount of memory, disc space and/or network connection resources) can be used by the respective VM 120. It is worth mentioning that—due to the virtualization of the VMs—said computational resources of the VMs 120 are provided by the host computing system 110.

In order to be aware of performance bottlenecks in the respective VM 120, respectively in the host computing system 110 itself, one or more thresholds are defined. Said threshold may define a boundary until which a regular operation of the VM 120 is assumed. Preferably, for each VM 120 and for each computational resource (e.g. CPU power, amount of memory, disc space and/or network connection resources) a certain threshold is defined. When the computational resource exceeds said threshold, a performance ticket is issued. Handling of said performance tickets is time-consuming and requires great expenditure in terms of human resources and costs. The bubbles of FIG. 4 show the CPU usage 130 of a certain VM 120 and the host computing system 110 over time together with the respective threshold 140. The diagram to the right of the CPU usage 130 diagram shows the issued performance tickets 150 over time based on said CPU usage 130 and said threshold 140. Each time the CPU usage 130 rises above the threshold 140, a performance ticket is issued.

Figure 5:
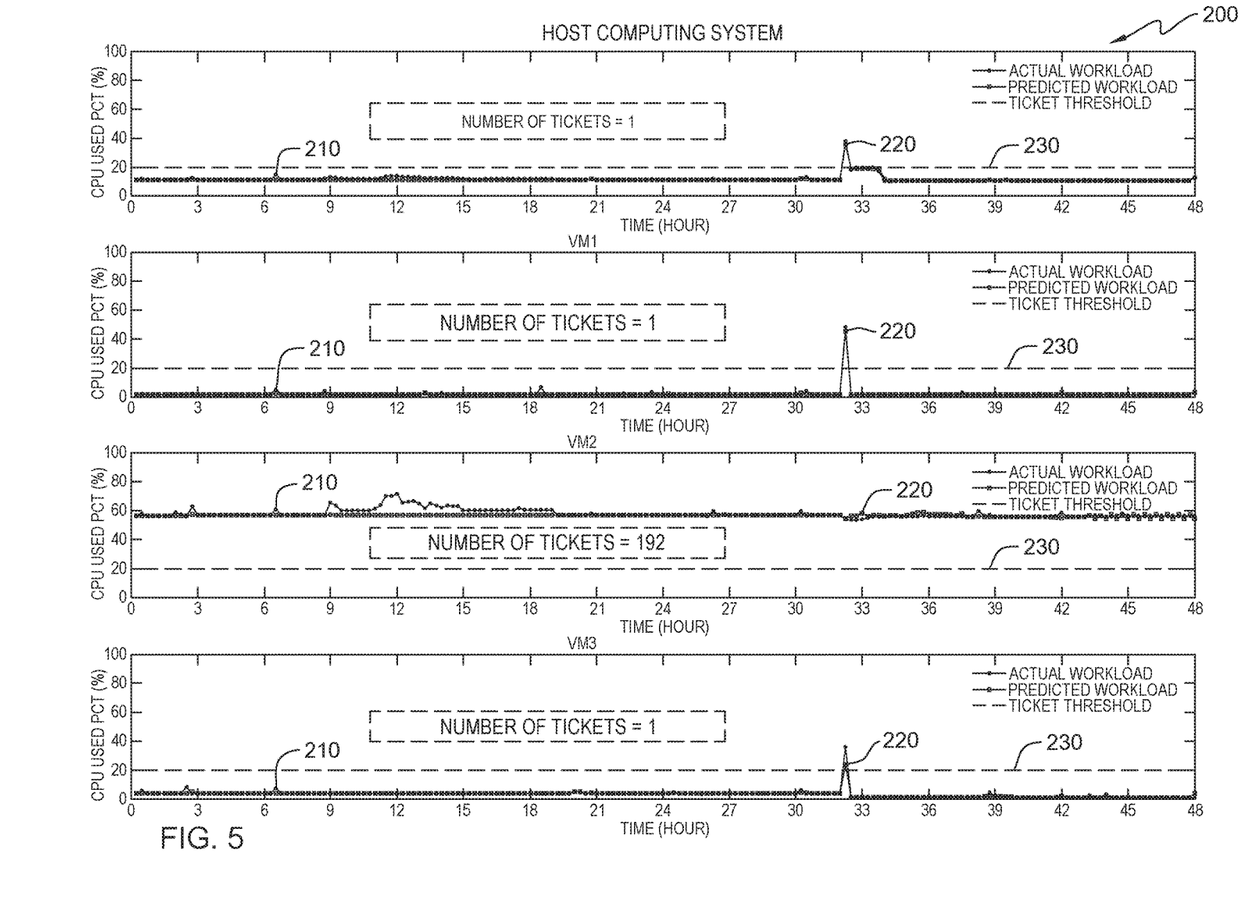
FIG. 5 illustrates multiple workload graphs of a host computing system and multiple virtual machines hosted on said host computing system together with thresholds defined for each workload and the number of tickets issued based on said threshold value.

FIG. 5 shows multiple diagrams 200, each diagram including multiple graphs indicating the actual CPU usage workload 210, the predicted CPU usage workload 220 and the ticket threshold 230. The first diagram refers to the workload of the host computing system 110 and the further diagrams refer to the workload of virtual machines VM1, VM2 and VM3. As shown in the third diagram referring to VM2, a great number of tickets are issued by VM2 because the actual workload is significantly higher than the threshold value. In the following, methods and systems for accurately predicting VM resource demands for a certain optimization horizon, for identifying an optimal size of the VMs for a reduced number of performance tickets and for resizing of VMs according to the identified optimal sizes are disclosed.

Figure 6:
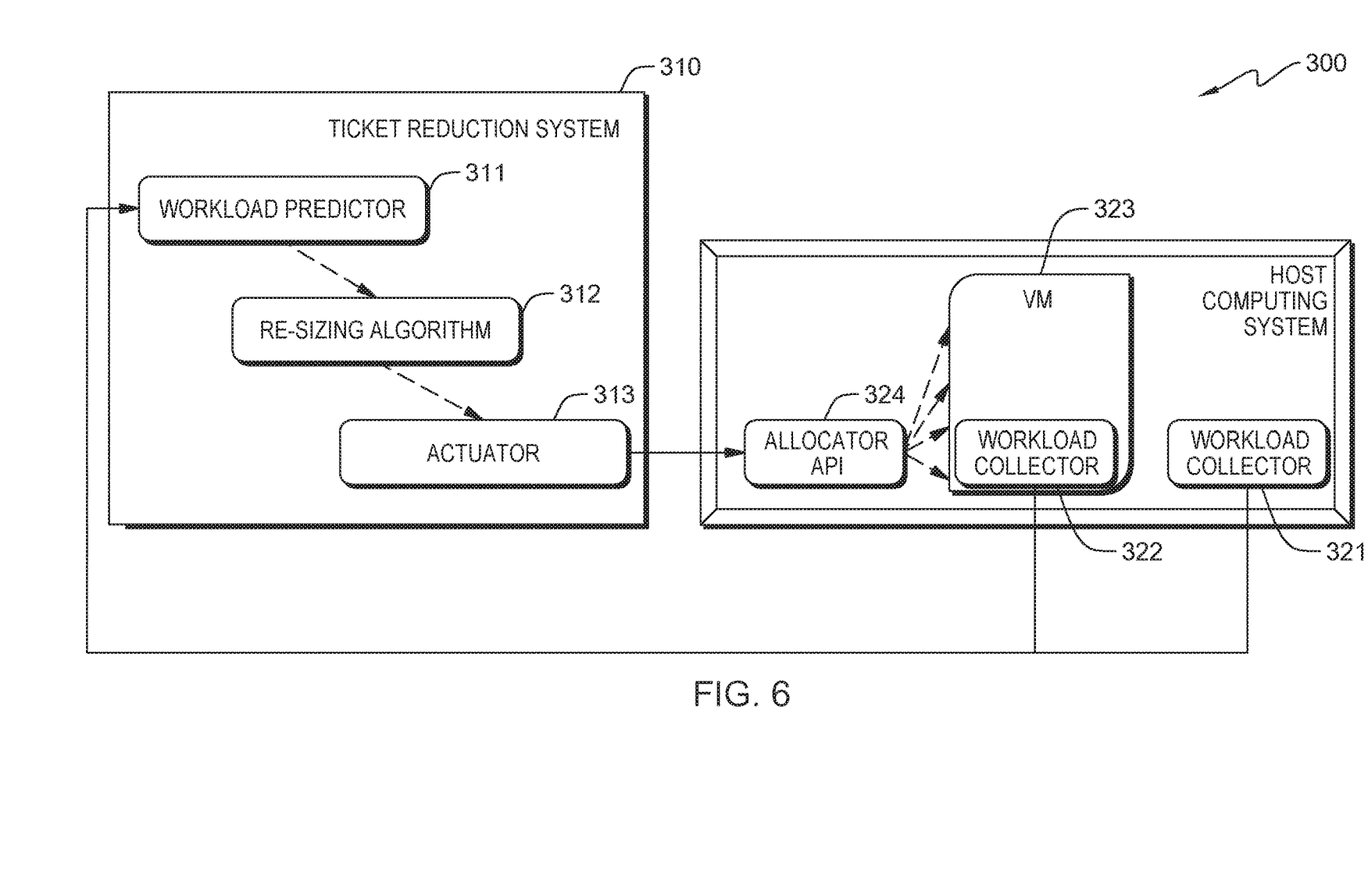
FIG. 6 illustrates a schematic block diagram of a ticket reduction system and its functional coupling with a host computing system.

FIG. 6 shows a system 300 for reducing the number of issued performance tickets. The system comprises a ticket reduction system 310 coupled with or included in a host computing system 320. In other words, the ticket reduction system 310 can be integrated in the host computing system 320 or may be a separate system which is functionally coupled with the host computing system 320. The host computing system 320 comprises a workload collector 321 for monitoring the computational resources associated with the host computing system 320 itself and one or more further workload collector 322 associated with the VMs 323. More in detail, each VM 323 may comprise its own workload collector 322 which monitors the computational resources of the respective VM 323.

The ticket reduction system 310 is functionally coupled with the host computing system 320 such that the information gathered by the workload collector entities 321, 322 is provided to a workload predictor 311 of the ticket reduction system 310. The workload predictor 311 is configured to accurately predict the computational resource demands of the VM 323 based on historic workload information provided by the workload collector entities 321, 322 for the next optimization horizon. More in detail, for each VM 323 hosted on the host computing system 320, the workload predictor 311 may predict future computational resource demands. Based on said future computational resource demands, a re-sizing algorithm 312 may calculate the computational resources to be allocated to the respective VM 323 in order to obtain a reduced number of issued performance tickets. In other words, the re-sizing algorithm 312 provides an improved distribution of computational resources between the VMs 323 in order to obtain a reduced number of issued performance tickets. After determining information regarding said improved distribution of computational resources, said information is provided by the ticket reduction system 310, specifically by an actuator 313 included in the ticket reduction system 310 to an allocator application programming interface (API) 324 of the host computing system 320. Said allocator API 324 initiates the allocation of computational resources to the respective VMs 323 according to the distribution of computational resources suggested by the re-sizing algorithm 312.

Figure 7:
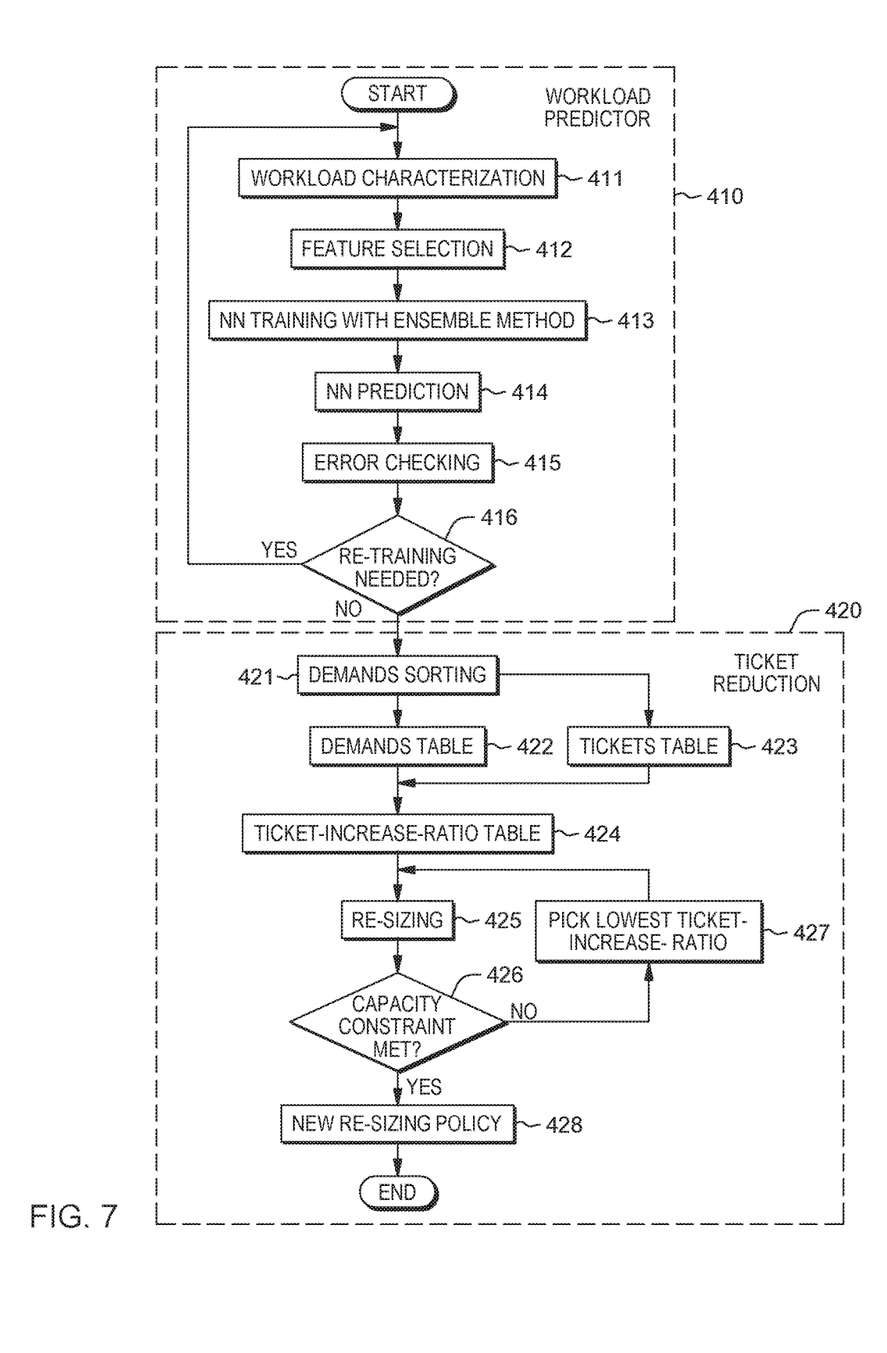
FIG. 7 shows a flow diagram of a method for predicting workload of a certain VM and a ticket reduction method implementing a resizing of allocated computational resources.

FIG. 7 illustrates the tasks performed by the workload predictor 311 and re-sizing algorithm 312 according to FIG. 6 in greater detail. The performed tasks are grouped in a workload prediction part 410 (performed by the workload predictor 311) and a ticket reduction part 420 (i.e. a part which provides a reduced number of issued performance tickets based on a re-sizing of computational resources allocated to the respective VM). At the beginning of the workload prediction part 410, a workload characterization 411 may be performed. Said workload characterization 411 may be performed based on historic information regarding the usage of computational resources by the respective VM (e.g. received from the respective workload collectors). It is worth mentioning that the steps of workload prediction should be performed for said VMs separately in order to be able to predict future workload of each VM. It is worth mentioning that by using spatial dependencies between VMs, the workload of at least some of the VMs can be estimated based on the workload estimation result of spatial dependent VMs. The goal of said workload characterization is that certain information of historic workload sequences are filtered out which can be used for predicting future workload.

Workload characterization 411 may use temporal dependencies and/or spatial dependencies, i.e. correlations between workloads of different VMs to predict future workload of a certain VM. For example, by investigating historic workload sequences, periodically appearing workload characteristics might be recognized which can be used for accurately predicting the future workload of a certain VM. So, the workload characterization 411 may be deployed for understanding temporal dependencies within a given sequence of data indicating the usage of a computational resource, in the following also referred to as usage series, in order to be able to predict future workload of a certain VM. For example, temporal dependencies within a certain usage series may be derived by using an auto-correlation function.

As already mentioned before, workload characterization 411 may also use spatial dependencies. Depending on the performed task, there may be a correlation between the usage of computational resources between different VMs. In other words, a certain task executed on a first VM influences the computational resources of a second VM and vice versa. Said spatial dependencies between different co-located VMs can be, for example, detected by a Dynamic Time Warp algorithm. Said Dynamic Time Warp algorithm may detect which usage series of a VM is correlated with a usage series of another VM. Preferably, a clustering of usage series of certain VMs is performed, each cluster comprising usage series showing spatial dependencies above a certain threshold. Due to said spatial dependencies, it may be sufficient to predict the future computational workload, i.e. the future usage series of a single VM included in one group and estimate the future computational workload of all other VMs by using the already predicted usage series of the VM of said group. For example, said estimation of usage series of all other VMs may be obtained by linearly fitting usage series outside of the signature series, with all the final signature series and predicting usage series outside of the signature series by plugging in the predicted final signature series.

A feature selection step 412 may be performed after performing workload characterization using temporal dependencies. As mentioned before, during workload characterization 411 temporal dependencies within usage series are evaluated in order to find certain periodicities (e.g. certain resource usage pattern appearing hourly, daily or weekly). During feature selection step 412 one or more features investigated during feature selection are selected which are used for predicting future usage series. More in detail, out of all investigated temporal characteristics the most informative one/ones may be filtered out in order to use said characteristics for future usage series prediction. In case that both temporal and spatial dependencies are used to obtain information for future usage series prediction, a usage series of a certain VM of a group of VMs may be selected based on investigated spatial dependencies of usage series within said group of VMs, temporal dependencies within said selected usage series are investigated and most informative features/characteristics are selected in order to predict the future usage series. After prediction, the prediction result may be used to predict the usage series of the other VMs included in the group of VMs showing similar spatial dependencies.

Based on the features/characteristics received from feature selection step 412, one or more neural networks are trained. More in detail, for each usage series to be predicted at least one neural network is trained. Preferably, for each usage series multiple neural networks applying different algorithms are trained in order to combine the prediction results of said multiple neural networks for providing a robust prediction. During said training, the relationship between the provided features/characteristics and the output (predicted usage series) is modelled.

After performing the training of the neural networks, the trained set of neural networks is used to predict future usage series (414). More in detail, for each usage series to be predicted, one or more trained neural networks may be used for estimating the future usage of computational resources of the respective VM. As mentioned before, an ensemble method may be applied which uses multiple neural networks implementing different models for estimating future usage series. Thereby, the prediction quality is significantly enhanced.

The predicted usage series may be checked regarding the appearance of errors or abnormal developments of the usage series (415). More in detail, the error checking step may detect trend changes of the usage series. If such trend change has been detected, the trained neural network may not be able to predict the future usage series accurately. Therefore, new neural networks and/or new workload characterization and feature selection may be necessary. Therefore, if said error checking indicates that the prediction result is unsatisfying, a re-training is needed (416) and the workload predictor 410 may iterate the pre-described steps in order to obtain a better usage series prediction. If the prediction result is evaluated as satisfying, a ticket reduction process is performed which includes a resizing of computational resources assigned to the respective VMs.

In general, the result of the workload predictor 410 indicates the usage of one or more computational resources of each VM hosted on a host computing system. Thus, based on said workload prediction it is possible to shape computational resources available to be provided to the VMs such that the number of performance tickets issued by all VMs is reduced or minimized. The workload predictor 410 may predict usage series for a certain time interval, e.g. for some hours or one day. Said usage series may include time-dependent samples of demands of a certain computational resource (e.g. CPU power at a certain point of time). Said usage series predicted for each VM may be used as an input of the ticket reduction process 420.

First, a demand sorting 421 may be performed. For each VM, a demand table 422 may created which includes a plurality of demand samples of a certain computational resource. Said demand table 422 may be sorted in a descending order, i.e. the highest demand value may be provided at the top row of the demand table 422. A ticket table 423 may be associated with the demand table 422. The ticket table includes multiple entries wherein each entry is associated with an entry of the demand table 422. The ticket table entries provide information regarding the number of tickets issued due to the demand of certain computational resource (which is included in the corresponding row of the demand table 422). The ticket table may be calculated based on the respective demand of certain computational resource (included in the demand table 422) and a given threshold value above which a ticket is issued.

Based on the demand table 422 and the ticket table 423, a ticket-increase-ratio table 424 is calculated. Said ticket increase ratio table includes ticket-increase-ratio information, said ticket-increase-ratio information being indicative for the increase of issued tickets in relation to the saved computational resources. More in detail, the ticket-increase-ratio information may be reflected by a quotient indicating the change of number of issued tickets (Δ ticket) divided by the change of computational resource. For example, the ticket-increase-ratio information TIR may be calculated by the following formula:

$$TIR_{i,o} = \frac{P_{i,o-1} - P_{i,o}}{D_{i,o} - D_{i,o-1}}$$

wherein $D_{i,o}$ denotes an entry of the demand table 422, $P_{i,o}$ denotes an entry of the ticket table 423, i denotes the index of the respective VM and o denotes the index of an entry within the demand table 422, respectively, the ticket table 423.

In a broader sense, the ticket-increase-ratio table 424 (including ticket-increase-ratio information TIR) reflects the amount of increase of the number of issued tickets when reducing the computational resources assigned to the respective VM.

Based on the ticket-increase-ratio table 424, a re-sizing of computational resources is performed (425). Said re-sizing is performed based on the ticket-increase-ratio information TIR included in the ticket-increase-ratio table 424. More in detail, at the beginning of the resizing method, each VM may be associated with the maximum demand of computational resource which appears within the demand table 422 (e.g. first entry of the table sorted in a descending order). In case that the sum of all computational resources assigned to the VMs exceeds the capacity available at the host computing system (i.e. the capacity constraint is not met) (426), the computational resources assigned to one or more VMs have to be reduced. Said reduction is made by considering the ticket-increase-ratio information TIR because said ticket-increase-ratio information TIR indicates which VM should be cut down in terms of computational resources in order to obtain no or only low increase of issued performance tickets and in order to free as much computational resources as possible.

More in detail, when hosting multiple VMs on a certain host computing system, each VM may be associated with a set of ticket-increase-ratio information TIR associated with its demand table 422 and its ticket table 423. The available computational resources may be shared between said multiple VMs such that a minimum number of performance tickets are issued. So, after trying to assign each VM the maximum demand of computational resource which appears within its demand table 422, the reduction process of computational resources may be performed such that the VM with the lowest ticket-increase-ratio is investigated (427) and the computational resources of the VM comprising the lowest ticket-increase-ratio are reduced (425). After said reduction of computational resources, there is a check whether the capacity constraint is met (426), i.e. the system checks whether the available resources are enough to assign the proposed computational resources (the computational resources of a certain VM are reduced, all the other are still at maximum value) to the respective VMs. If so, the new resizing policy is applied, i.e. during a certain time interval, computational resources according to the output of the re-sizing algorithm are applied to the respective VMs.

If the capacity constraint is not met (426), once again the re-sizing loop is traversed, i.e. the VM with the lowest ticket-increase-ratio information TIR is investigated and the computational resources of said VM are reduced to the next lower demand value included in the demand table. Once again, a reduction of the assigned computational resources is obtained in order to meet the capacity constraints of the host computational system.

Figure 8:
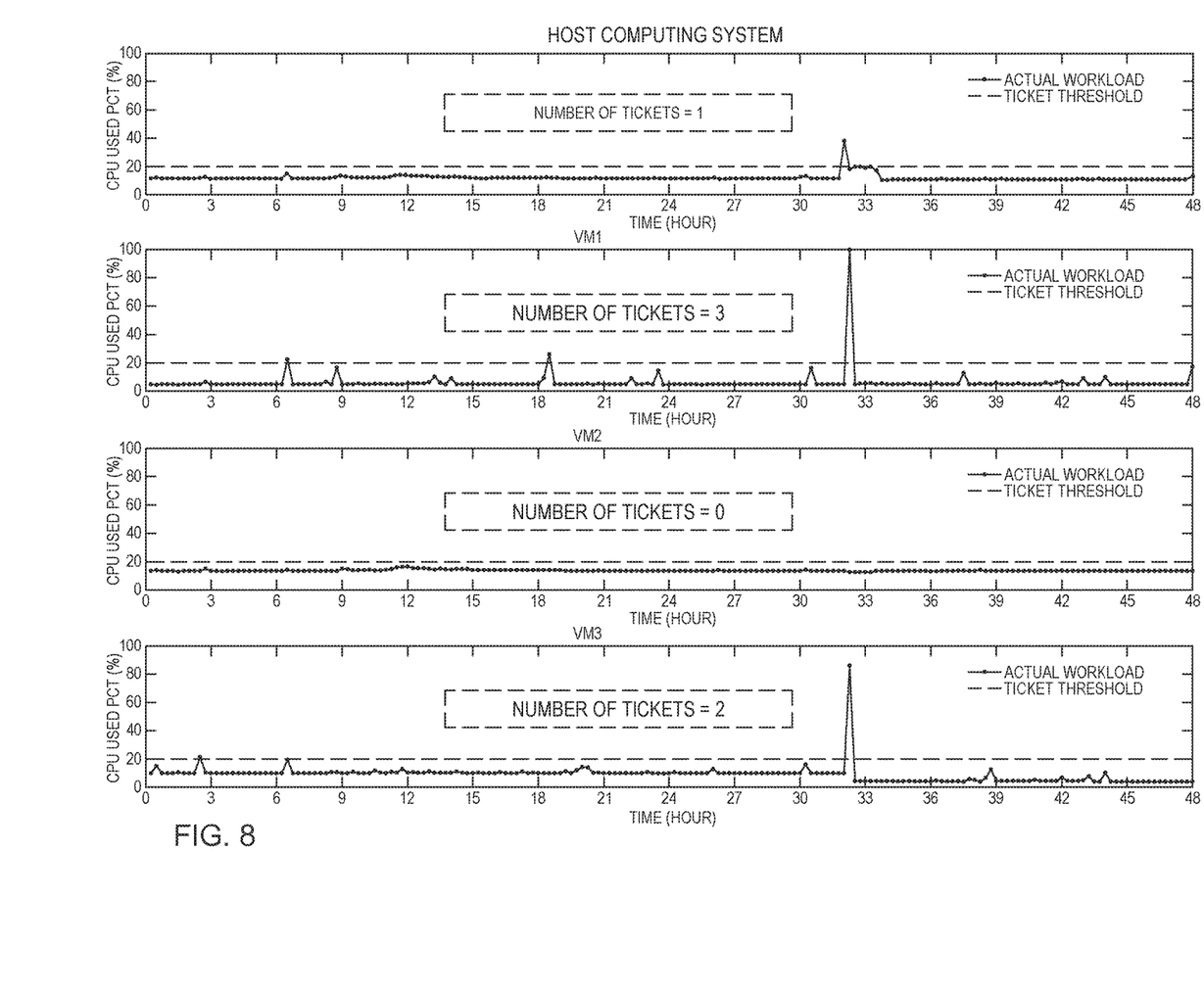
FIG. 8 illustrates multiple workload graphs of a host computing system and multiple virtual machines hosted on said host computing system together with thresholds defined for each workload and the number of tickets issued based on said threshold value after applying the proposed ticket reduction method.

As shown in FIG. 8, due to said resizing of the computational resources allocated to the respective VMs, the computational resources of VM2 are significantly increased and the computational resources of VM1 and VM3 are reduced accordingly which leads to a significantly reduced number of issued performance tickets.

Summing up, a system and method for reducing the issuance of performance tickets has been presented. Said system/method is advantageous because the number of occurring performance tickets are reduced which leads to reduced operating costs due to reduced ticket handling effort.

The invention claimed is:

1. A computer-implemented method for preventing the occurrence of performance tickets in a computing system comprising a plurality of virtual machines hosted by a host computing system, the method comprising the steps of:
    monitoring a resource usage parameter associated with the workload of a virtual machine in order to obtain historic resource usage information;
    determining information regarding certain dependencies within the historic resource usage information;
    selecting partial information from the historic resource usage information based on said determined information regarding certain dependencies;
    estimating the future workload of the virtual machines based on said selected partial information;
    resizing the computational resources of one or more virtual machines based on the estimated future workload such that a usage threshold of a computational resource is below a given threshold in order to avoid the generation of a performance ticket, and
    providing for each virtual machine a demand table and a ticket table associated with the demand table, said demand table comprising entries specifying the usage of certain computational resources and said ticket table comprising entries specifying the occurrence of tickets associated with a respective usage of certain computational resources, wherein for at least some entries of the demand table, a ticket-increase-ratio is calculated which is indicative of a ratio of ticket reduction and freeing of resources which can be obtained by choosing reduced computational resources according to subsequent entries of the demand table.

2. The computer-implemented method of claim 1, wherein determining information regarding certain dependencies within the historic resource usage information comprises determining information regarding temporal dependencies within historic resource usage information of a certain virtual machine and/or determining information regarding spatial dependencies between historic resource usage information of different virtual machines.

3. The computer-implemented method of claim 2, wherein said information regarding temporal dependencies is determined based on an auto-correlation function.

4. The computer-implemented method of claim 2, wherein said information regarding spatial dependencies is determined based on a Dynamic-Time-Warping algorithm.

5. The computer-implemented method of claim 1, wherein selecting partial information from historic resource usage information comprises selecting partial information which shows significant temporal periodicity.

6. The computer-implemented method of claim 1, wherein selecting partial information from historic resource usage information comprises selecting partial information associated with a first virtual machine which shows significant dependency on or similarity to resource usage information of a second virtual machine.

7. The computer-implemented method of claim 1, wherein said estimating of future workload is performed based on neural networks and said neural networks are trained based on said partial information selected from the historic resource usage information.

8. The computer-implemented method of claim 7, wherein said future workload is predicted by said trained neural networks.

9. The computer-implemented method of claim 1, wherein said future workload is predicted by estimating the future workload of a first virtual machine based on investigated temporal dependencies and estimating the future workload of a second virtual machine by considering that the first and the second virtual machine show similar temporal dependencies.

10. The computer-implemented method of claim 1, wherein an error check is performed on the estimated future workload, said error check detecting a poor workload estimation result if the estimated workload leaves a workload range defined by a threshold value.

11. The computer-implemented method of claim 10, wherein if said error check indicates a poor workload estimation result, then repeating said steps of:
    determining information regarding certain dependencies within the historic resource usage information;
        selecting partial information from the historic resource usage information based on said determined information regarding certain dependencies; and
        estimating the future workload of the virtual machines based on said selected partial information.

12. The computer-implemented method of claim 1, wherein the demand table is sorted according to the used computational resources.

13. The computer-implemented method of claim 1, wherein the ticket-increase-ratio is defined by:

$$TIR_{i,o} = \frac{P_{i,o-1} - P_{i,o}}{D_{i,o} - D_{i,o-1}}$$

wherein $D_{i,o}$ denotes an entry of the demand table, $P_{i,o}$ denotes an entry of the ticket table, i denotes the index of the respective virtual machine and o denotes the index of an entry within the demand table, respectively, the ticket table.

14. The computer-implemented method of claim 1, wherein the computational resources provided to the respective virtual machines are adapted based on the ticket-increase-ratio such that starting at computational resource allocation referring to the highest computational resource demand of a respective virtual machine said computational resource allocation is lowered by considering the ticket-increase-ratio until a capacity constraint defined by the available computational resources of the physical sever hosting the virtual machines is met.

15. The computer-implemented method of claim 1, wherein the physical resources provided to the respective virtual machines are reduced based on the ticket-increase-ratio gradually by choosing a physical resource allocation for the respective virtual machine which provides freeing-up of physical resources with no or minimum increase of the number of tickets occurring due to said freeing-up of physical resources until a capacity constraint defined by the available physical resources of the host computing system is met.

16. The computer-implemented method of claim 1, wherein said resizing of computational resources comprises providing information regarding a desired resource allocation of the virtual machines to an allocator entity included in the host computing system and wherein said allocator entity initiates a resource allocation for the respective virtual machines according to said resource allocation information.

17. A computer program product for preventing the occurrence of performance tickets in a computing system comprising multiple virtual machines, the computer program product comprising a computer readable storage medium having program instructions embodied therewith, the program instructions executable by a processor to cause the processor to execute the method according to claim 1.

18. A system for estimating computational resources for preventing the occurrence of performance tickets in a computing system comprising a plurality of virtual machines hosted by a host computing system, the system comprising:
    a hardware processor;
    a memory coupled to the hardware processor, said memory comprising instructions configuring the processor to:
    monitor a resource usage parameter associated with the workload of a virtual machine in order to obtain historic resource usage information;
    determine information regarding certain dependencies within the historic resource usage information;
    select partial information from the historic resource usage information based on said determined information regarding certain dependencies;
    estimate the future workload of the virtual machines based on said selected partial information;
    resize the computational resources of one or more virtual machines based on the estimated future workload such that a usage threshold of a computational resource is below a given threshold in order to avoid the generation of a performance ticket, and
    provide for each virtual machine a demand table and a ticket table associated with the demand table, said demand table comprising entries specifying the usage of certain computational resources and said ticket table comprising entries specifying the occurrence of tickets associated with a respective usage of certain computational resources, wherein for at least some entries of the demand table, a ticket-increase-ratio is calculated which is indicative of a ratio of ticket reduction and freeing of resources which can be obtained by choosing reduced computational resources according to subsequent entries of the demand table.

* * * * *